United States Patent [19]

Beggs et al.

[11] 4,188,022
[45] Feb. 12, 1980

[54] HOT DISCHARGE DIRECT REDUCTION FURNACE

[75] Inventors: Donald Beggs; Robert M. Escott, both of Charlotte, N.C.

[73] Assignee: Midrex Corporation, Charlotte, N.C.

[21] Appl. No.: 940,806

[22] Filed: Sep. 8, 1978

[51] Int. Cl.² .............................................. F27B 1/20
[52] U.S. Cl. .................................................. 266/195
[58] Field of Search ........................................ 266/195

[56] References Cited
U.S. PATENT DOCUMENTS
3,836,131  9/1974  Beggs .................................. 266/195

Primary Examiner—M. J. Andrews
Attorney, Agent, or Firm—Ralph H. Dougherty

[57] ABSTRACT

A method and apparatus for the continuous direct reduction of metal oxides, ores, etc. to a hot metallized product in solid form. A gas unique seal is employed to prevent the leakage of reduction gas from the bottom of the closed shaft furnace when the product is being discharged which does not affect the discharge temperature of the product.

7 Claims, 2 Drawing Figures

HOT DISCHARGE DIRECT REDUCTION FURNACE

BACKGROUND OF THE INVENTION

This invention relates to a method and apparatus for the direct reduction of metal oxides, ores, and the like to a highly metallized product which is discharged at high temperature and is particularly well suited for briquetting or other means of densification.

Cold discharge furnaces for the direct reduction of iron oxides to sponge iron have proven to be very successful commercially. However, merely omitting the cooling means for a direct reduction furnace is insufficient to achieve a satisfactory hot discharge furnace. In counterflow shaft type furnaces in general, and in shaft furnaces for direct reduction of iron in particular, the highest gas pressure in the furnace is always in the lower region of the furnace due to the upwardly flowing gases. In the direct reduction of iron, the gases in the furnace are highly flammable due to the high content of CO and $H_2$ which are necessary for reduction of iron.

In shaft furnaces containing highly flammable gases, the furnace discharge region from which the processed solids are discharged is subject to the hazards of fire which can both harm personnel and damage equipment. This is particularly true where the solids are discharged hot for further processing such as the hot briquetting of direct reduced iron. Thus, the principal problem which must be overcome is that the furnace discharge outlet must be provided with means for preventing leakage of highly combustible furnace gas. Also, the seal gas must not adversely affect the discharge temperature of the hot product. Mechanical valves or locks have been tried without success in hot discharge direct reduction furnaces. These mechanical devices tend to become bound or stuck because of the softness and stickiness of the hot reduced iron product. This usually causes such valves to leak.

In the present invention, a hot discharge shaft furnace for the direct reduction of iron is directly coupled to a hot briquetting machine for densifying the direct reduced iron product. Although the hot briquetting machine is directly coupled to the furnace discharge, it is isolated from the highly flammable gases which are maintained at relatively high pressure in the reduction furnace by a seal gas system at the lower end of the furnace. This seal gas system insures that the gases present at the furnace discharge are non-flammable despite the highly flammable character of the gases present within the reduction furnace.

OBJECTS OF THE INVENTION

It is the principal object of this invention to provide a direct reduction furnace capable of continuously discharging hot direct reduced metallized product suitable for subsequent agglomeration for easy handling.

It is also an object of this invention to provide a hot discharge direct reduction furnace which requires no mechanical seal to limit the escape of furnace gases or reducing gases through the product discharge opening.

It is another object of this invention to provide a means for sealing the discharge opening against atmospheric gases.

It is also an object of this invention to provide a method for producing hot direct reduced iron pellet product.

SUMMARY OF THE INVENTION

To achieve the objects of this invention, we provide a closed shaft furnace containing highly combustible gases with gas seal at the furnace discharge to seal against out-leakage of the highly combustible gases. The gas seal includes means for recirculating a non-combustible gas through the lower region of the furnace at sufficient pressure to prevent the downflow of combustible gases.

BRIEF DESCRIPTION OF THE DRAWING

This invention is better understood by referring to the following detailed description and the appended drawings in which.

DETAILED DESCRIPTION

Figure 1:
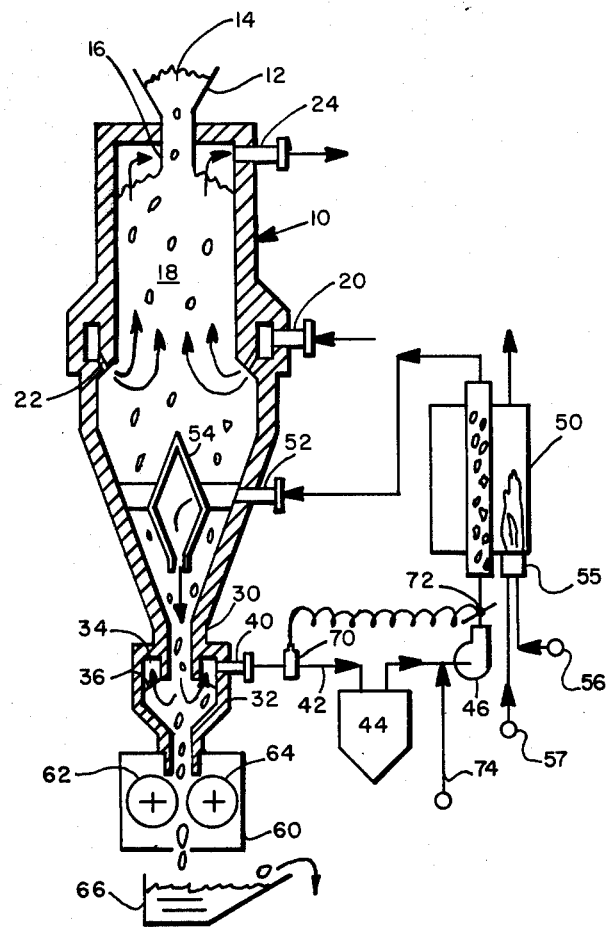
FIG. 1 is an elevational cross-section of the furnace of the invention with an associated product briquetter.

Referring now to the drawing, a vertical shaft furnace 10 has a feed hopper 12 mounted at the top thereof into which iron oxide pellets 14 or other particulate feed materials such as lump ore are charged. The pellets descend by gravity through one or more feed pipes 16 to form a bed 18, or burden, of particulate iron oxide containing material in the shaft furnace. At the central part of the shaft furnace 10 is a hot gas bustle and tuyere system indicated generally at 20 having gas ports 22 through which hot reducing gas is introduced to flow upwardly in countercurrent relationship to the movement of burden 18. Spent top gas exits the furnace through gas takeoff pipe 24.

At the bottom of the furnace 10 is a pellet discharge pipe 30 which connects the interior of the furnace to a small hopper 32 or seal gas disengaging chamber, which is filled with hot pellets discharging by gravity from the lower end of the furnace. The discharge pipe 30 extends into hopper 32 to form a gas disengaging plenum 34. The hopper being larger in diameter than pipe 30, the discharged pellets form an angle of repose as indicated at 36 through which seal gas is disengaged from the pellets in hopper 32. A seal gas takeoff outlet 40 removes seal gas from the plenum 34. A gas cleaning and recirculating circuit is provided to remove solids and condensible matter from the seal gas and to reheat it to the desired temperature for reintroduction to the discharge zone of the furnace. The removed seal gas flows through a takeoff pipe 42 to a cooler scrubber 44 wherein condensibles and particulates are removed. Pump or compressor 46 forces the cleaned seal gas through seal gas heater 50 wherein it is heated to an introduction temperature of 600° to 300° C. or preferably to between 650° and 750° C., which is a preferred temperature range for that discharge of the pellets, and from whence it is reintroduced to the furnace 10 through inlet pipe 52 and seal gas distributor 54. Heater 50 is fired by suitable burners 55 from an air source 56 and a fuel source 57.

Beneath the hopper 32, a hot briquetting machine 60 includes counter-rotating rolls 62 and 64 which compress the hot reduced pellets to form a briquet product. The hot briquet product may be discharged into a quench tank 66 or may be cooled by any other desirable means such as air cooling.

The hot briquetting machine is a good volumetric feeder and is utilized as the furnace discharge control mechanism. The rate of discharge is directly related to the speed of rotation of the briquetting rolls.

Figure 2:
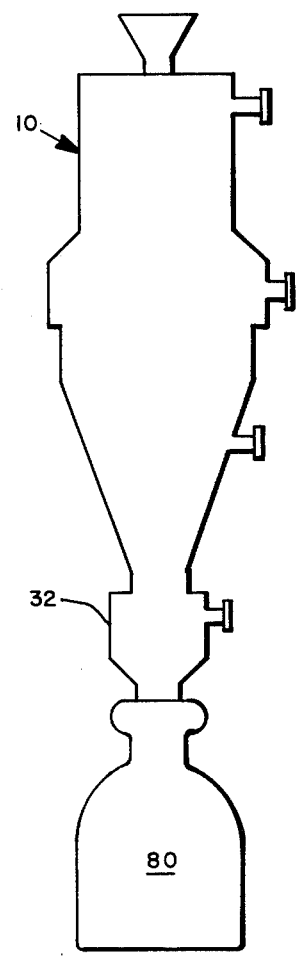
FIG. 2 is a schematic view of the invented furnace with an associated hot discharge container.

As an alternative to the hot briquetting machine of FIG. 1, a discharge control mechanism such as a wiper bar can be added to the bottom of discharge hopper 32 and the product may be discharged directly into a container 80 as shown in FIG. 2. This container is sealed after filling then transported to an electric arc steelmaking furnace and the pellets are charged hot into the furnace. This reduces the energy and time required to heat the charge to the melting point in the electric furnace.

A pressure sensor 70, which controls the pressure at slightly above atmospheric in the seal gas disengaging chamber, is shown located in the seal gas offtake pipe 42. This sensor, which could just as well be located in the chamber above the angle or repose, maintains a very low pressure in the chamber by controlling the action of a flow control valve 72 in the seal gas recirculating system. The seal gas pressure at distributor 54 is sufficient to prevent downflow of reducing gas from inlets 22 into the lower portion of the furnace. Thus the amount of reducing gas in the product is kept to a minimum.

In operation, the gas leakage from the furnace through the furnace discharge pipe 30 is principally recirculated seal gas with only small amounts of CO and $H_2$ reducing gas. A small amount of seal gas makeup is provided at 74. The seal gas is preferably a high nitrogen gas such as products of combustion containing no free oxygen.

It is readily apparent that from the foregoing that we have invented a method and apparatus for the production of a hot metallized iron product which is reduced to high metallization in a direct reduction shaft furnace and discharged hot in solid form for further processing without any attendant hazard.

What is claimed is:

1. In an apparatus for the direct reduction of metal oxides to a hot metallized product in solid form comprising a generally vertical shaft furnace having product introducing means at the top thereof, particle removal means at the bottom thereof for creating gravitational flow of particulate burden therethrough, intermediate reducing gas introduction means, and upper spent top gas removal means, the improvement comprising:
   a. a seal gas disengaging chamber integrally connected to the discharge outlet of said furnace in direct line of product flow;
   b. a seal gas removal means engaging said seal gas disengaging chamber;
   c. a seal gas introducing means in the lower portion of said furnace, and
   d. means connected to said seal gas removal means and to said seal gas introducing means for cleaning said seal gas and for heating said seal gas to the desired introduction temperature.

2. Apparatus according to claim 1 wherein said particle removal means includes a discharge pipe extending into said seal gas disengaging chamber a sufficient distance to create a seal gas disengaging plenum in the upper portion of said chamber.

3. Apparatus according to claim 1 further comprising a pressure sensor for determining the pressure within said chamber and an associated control means for controlling the flow of seal gas through the seal gas circuit.

4. Apparatus according to claim 3 further comprising means communicating with said seal gas circuit for adding additional seal gas to said seal gas circuit.

5. Apparatus according to claim 1 further comprising a hot briquetting machine communicating with said chamber for briquetting the hot metallized product.

6. Apparatus according to claim 5 further comprising briquet quenching means adjacent the briquet product discharge end of said hot briquetting machine.

7. Apparatus according to claim 1 further comprising a discharge control mechanism associated with said chamber, and a sealable container adapted for engagement with the discharge opening of said chamber and removable therefrom for receiving hot metallized product.

* * * * *

UNITED STATES PATENT AND TRADEMARK OFFICE
CERTIFICATE OF CORRECTION

PATENT NO. : 4,188,022
DATED : February 12, 1980
INVENTOR(S) : DONALD BEGGS and ROBERT M. ESCOTT It is certified that error appears in the above-identified patent and that said Letters Patent are hereby corrected as shown below:

Column 2, line 54 change "300° C." to -- 800° C. -- .

Signed and Sealed this

Thirteenth Day of January 1981

[SEAL]

Attest:

SIDNEY A. DIAMOND

Attesting Officer

Commissioner of Patents and Trademarks